United States Patent [19]

Oota

[11] Patent Number: 4,852,040
[45] Date of Patent: Jul. 25, 1989

[54] VECTOR CALCULATION CIRCUIT CAPABLE OF RAPIDLY CARRYING OUT VECTOR CALCULATION OF THREE INPUT VECTORS

[75] Inventor: Shingo Oota, Tokyo, Japan
[73] Assignee: NEC Corporation, Tokyo, Japan
[21] Appl. No.: 168,882
[22] Filed: Mar. 3, 1988
[30] Foreign Application Priority Data Mar. 4, 1987 [JP] Japan .................................. 62-47711
Mar. 4, 1987 [JP] Japan .................................. 62-47714

[51] Int. Cl.$^4$ ............................................. G05F 7/52
[52] U.S. Cl. ..................................... 364/768; 364/736
[58] Field of Search ... 364/736, 768, 784, 200 MS File, 364/900 MS File

[56] References Cited

U.S. PATENT DOCUMENTS

| | | | |
|---|---|---|---|
| 3,900,723 | 8/1975 | Bethany et al. | 364/736 |
| 4,525,796 | 6/1985 | Omoda et al. | 364/736 |
| 4,665,479 | 5/1987 | Oinaga | 364/736 |
| 4,677,547 | 6/1987 | Omoda et al. | 364/200 |
| 4,757,444 | 7/1988 | Aoyama et al. | 364/736 |
| 4,777,592 | 10/1988 | Yano | 364/736 |

Primary Examiner—Gary V. Harkcom
Assistant Examiner—Dale M. Shaw
Attorney, Agent, or Firm—Foley & Lardner, Schwartz, Jeffery, Schwaab, Mack, Blumenthal & Evans

[57] ABSTRACT

In a vector calculation circuit for use in a vector addition of first, second, and third vectors each of which is composed of an identical number to one another, a first adder circuit (26) comprises a carry save adder which carries out a carry save addition of a set of three components selected from the first through third vectors to produce a local sum and a carry collectively as a result of the carry save addition. The local sum and the carry is successively summed up by a second adder circuit (27) to produce a primary sum which forms an output vector. The primary sum may successively be sent back to the first adder circuit as the third vector. A selector circuit may be connected to the first adder circuit to select the first through third vectors and a fixed value of zero and to selectively add either two of the first through third vectors or three of them. Alternatively, a pair of selectors may be included to select either the first and the second vectors or the local sum and the carry.

4 Claims, 11 Drawing Sheets

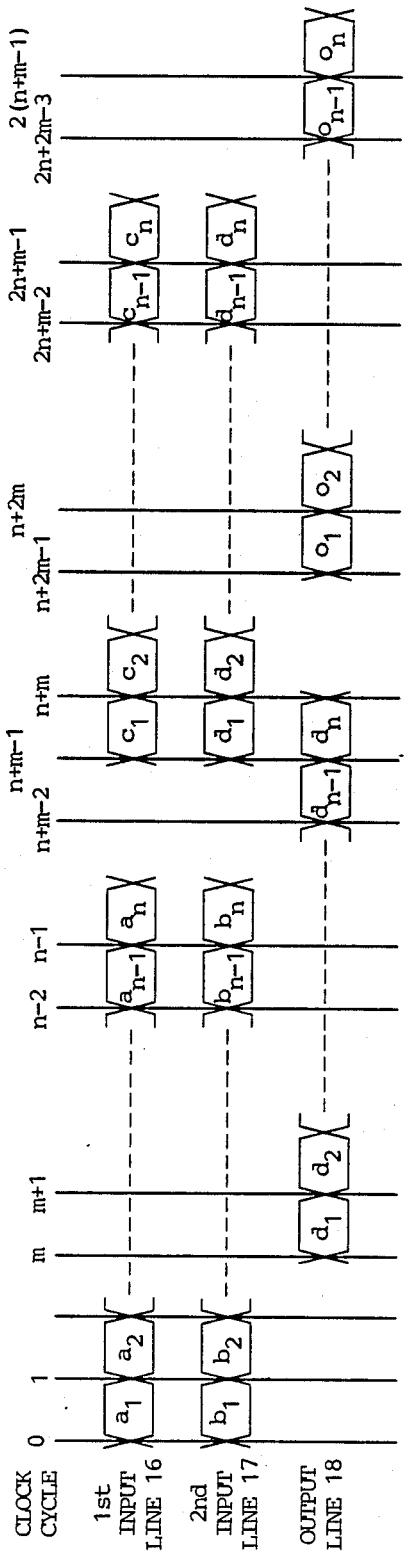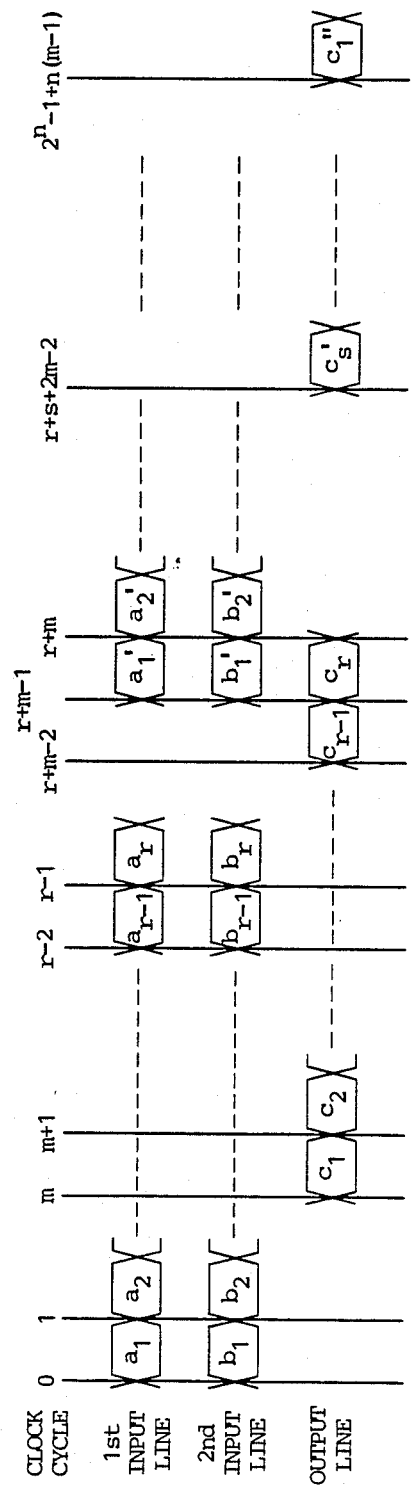

4,852,040

VECTOR CALCULATION CIRCUIT CAPABLE OF RAPIDLY CARRYING OUT VECTOR CALCULATION OF THREE INPUT VECTORS

BACKGROUND OF THE INVENTION

This invention relates to a vector calculation circuit capable of carrying out a vector calculation of vectors. It is to be noted throughout the instant specification that each of the vectors is composed of a plurality of vector components or elements which are given in the form of electrical signals and which are electrically processed, although a specific description will not be made hereinafter.

A recent requirement for an electronic digital computer is to process a vector calculation at a high speed. As such a vector calculation, a vector addition is exemplified wherein a pair of vectors is added to each other. In this event, the vector addition should be repeated between the respective components of the vectors a great number of times because each of the vectors is composed of a lot of components.

Furthermore, it often happens that the vector addition must be carried out among three vectors each of which is also composed of a great number of components. In this case, two of the components are selected from two of the three vectors and are added to each other by the use of a vector adder to obtain a provisional sum. Thereafter, one of the components is selected from the remaining vector and is added to the provisional sum by the above-mentioned vector adder to provide a primary sum. Thus, the vector adder is used two times on carrying out the vector addition of three vectors.

Likewise, it is frequently required in the electronic digital computer to calculate a total sum of a great deal of components of a single vector. In this case, two of components are at first added to each other by the vector adder to calculate a local sum. Subsequently, the local sum is added to another component by the vector adder. Similar addition is successively repeated by the use of the vector adder to calculate the total sum of the components.

At any rate, the vector adder should be activated twice on carrying out the vector addition among three components of the three vectors. This means that the vector addition among three components is very time-consuming.

SUMMARY OF THE INVENTION

It is an object of this invention to provide a vector calculation circuit which can carry out a vector addition among three vectors at a high speed.

It is another object of this invention to provide a vector calculation circuit of the type described, which can quickly calculate a total sum more than two components.

It is still another object of this invention to provide a vector calculation circuit of the type described, which is convenient for processing a vector or vectors composed of an enormous number of components.

According to an aspect of this invention, there is provided a vector calculation circuit which is for use in carrying out a vector calculation to provide a result of said vector calculation in response to a first vector composed of a plurality of first-set components and a second vector composed of a plurality of second-set components and selectively to a third vector composed of a plurality of third-set components. The vector calculation circuit comprises selecting means responsive to one of the third-set components and a fixed value of zero for selecting, as a selected component, a selected one of the one of the third-set components and the fixed value, a carry save adder responsive to the selected component and requisite ones of the first-set and the second-set components for carrying out a carry save addition among the selected component and the requisite ones of the first-set and the second-set components to produce a local sum and a carry collectively as a result of the carry save addition, an additional adder responsive to the local sum and the carry for adding the carry to the local sum to produce a primary sum of the local sum and the carry, and means for producing the primary sum as the result of vector calculation According to another aspect of this invention, there is provided a vector calculation circuit which is for use in carrying out a vector calculation to provide a result of said vector calculation in response to a first vector composed of a plurality of first-set components and a second vector composed of a plurality of second-set components and selectively to a third vector composed of a plurality of third-set components. The vector calculation circuit comprises a carry save adder responsive to the first, second, and third vectors for carrying out a carry save addition of requisite ones of the first- through third-set components to produce a local sum and a carry collectively as the carry save addition, first selector means for selecting either of the local sum and the requisite one of the first-set components as a first selected component, second selector means for selecting either of the carry and the requisite one of the second-set components as a second selected component, an additional adder coupled to the first and the second selector mean for adding the first selected component to the second selected component to produce the result of the vector calculation.

BRIEF DESCRIPTION OF THE DRAWINGS

FIG. 2 is a time chart for use in describing operation of the vector calculation circuit illustrated in FIG. 1;

FIG. 3 is another time chart for use in describing another operation of the vector calculation circuit illustrated in FIG. 1;

DESCRIPTION OF THE PREFERRED EMBODIMENTS

Figure 1:
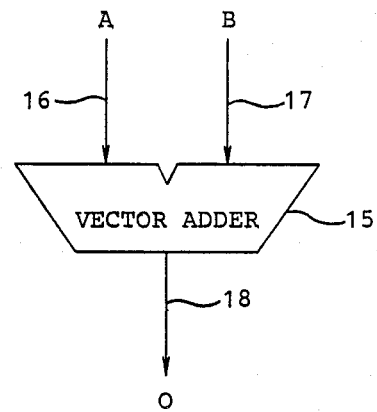
FIG. 1 is a block diagram of a conventional vector calculation circuit for use in carrying out a vector addition.

Referring to FIG. 1, a conventional vector calculation circuit will be described at first for a better understanding of this invention. The conventional vector calculation circuit is for use in carrying out a vector addition of a plurality of vectors. In this connection, the illustrated vector calculation circuit is specified by a vector adder 15 which is connected to first and second input lines 16 and 17. Two of the vectors are supplied to the vector adder 15 through the first and the second input lines 16 and 17, respectively, and may be called first and second vectors A and B (such vectors being denoted herein by ordinal letters rather than by thick letters).

It will be assumed that the first vector A is composed of a sequence of first-set components or elements ($a_1, a_2, \ldots, a_n$) which may be called first through n-th components of the first vector A, respectively. Likewise, the second vector B is composed of a sequence of second-set components ($b_1, b_2, \ldots, b_n$) which may be referred to as first through n-th components of the second vector B. Thus, the first vector A is assumed to have the same number of components as the second vector B in the illustrated example.

The vector addition of the first and the second vectors A and B is for calculating an output vector O composed of a sequence of output components ($o_1, o_2, \ldots, o_n$) which may be called first through n-th output components. Specifically, the vector adder 15 successively sums up the first-set and the second-set components ($a_1, a_2, \ldots, a_n$) and ($b_1, b_2, \ldots, b_n$) to produce the first through n-th output components ($o_1, o_2, \ldots, o_n$) which appear on an output line 18. Therefore, the output component $o_i$ is collectively given by:

$$o_i = a_i + b_i,$$

where i is a variable between 1 and n, both inclusive.

It is to be noted here that the illustrated vector adder 15 is also used for carrying out the vector addition of three vectors which will be called first, second, and third vectors A, B, and C composed of first-set, second-set, and third-set components ($a_1, a_2, \ldots, a_n$), ($b_1, b_2, \ldots, b_n$), and ($c_1, c_2, \ldots, c_n$). In this event, the vector adder 15 successively sums up at first the first-set components $a_i$ and the corresponding second-set components $b_i$ to produce a local sum vector D composed of local sum components $d_i$, where i is also a variable between 1 and n, both inclusive. The above-mentioned summation is therefore specified by:

$$d_i = a_i + b_i.$$ The local sum components $d_i$ are successively sent to the output line 18.

Thereafter, the local sum components $d_i$ are successively added to the third-set components $c_i$ by the vector adder 15 to produce an output vector which is depicted at 0 again and is composed of output components ($o_1, o_2, \ldots, o_n$) appearing on the output line 18. As a result, the output components $o_i$ is collectively represented by $$o_i = a_i + b_i + c_i.$$

In general, all of the local sum components $d_1$ through $d_n$ are calculated by the vector adder 15 and are thereafter added to the third-set components, respectively. From this fact, it is readily understood that the local sum components $d_i$ should be held in a register or registers (not shown) and thereafter supplied to the vector adder 11 again.

Practically, the vector adder 15 comprises a plurality of flip-flops in addition to an adder so as to carry out the vector addition in a pipeline fashion. Each pair of the first-set and the second-set components is successively delayed by the flip-flops in response to a sequence of clock pulses having a clock cycle and is calculated to be produced through the output line 18 as one of the output components after a predetermined duration. Herein, it is possible to define the predetermined duration as a calculation time for calculating the vector addition of a single pair of the components.

Referring to FIG. 2 together with FIG. 1, the first through third vectors A, B, and C are added to one another by the use of the vector adder 15 illustrated in FIG. 1 in a manner to be described later. In FIG. 2, the calculation time is assumed to be equal to mT, where m is an integer and T is representative of the clock cycle mentioned above. In addition, the first components $a_1$ and $b_1$ of the first and the second vectors A and B are given to the vector adder 15 through the first and the second input lines 16 and 17 in synchronism with a zeroth one of the clock pulses. Thereafter, the second through n-th components $a_2$ and $b_2$ through $a_n$ and $b_n$ are successively given to the vector adder 15 through the first and the second input lines 16 and 17 in synchronism with first through (n - 1)-th ones of the clock pulses, respectively. As a result, first through n-th component airs are arranged in first through n-th time intervals or clock cycles, respectively.

Responsive to the first components $a_1$ and $b_1$ of the first and the second vectors A and B, the vector adder 15 produces a first one $d_1$ of the local sum components of the local sum vector D through the output line 18 in timed relation to an m-th one of the clock pulses. As a result, the first local sum component $d_1$ appears on the output line 18 in synchronism with the m-th clock pulse (m), as shown in FIG. 2. Likewise, second through n-th ones $d_2$ to $d_n$ of the local sum components appear on the output line 18 in synchronism with (m+1)-th through (n+m - 1)-th ones of the clock pulses, respectively. The first through n-th local sum components $d_1$ to $d_n$ are sent to the registers to be sent to the vector adder 15 again.

In FIG. 2, the third vector C and the local sum vector D are given to the vector adder 15 through the first and the second input lines 16 and 17. More particularly, the first component $c_1$ of the third vector C is supplied to the vector adder 15 simultaneously with the first local sum component $d_1$ in synchronism with the (n+m−1)-th clock pulse. Similarly, the second through n-th components $c_2$ to $c_n$ of the third vector C and the second through n-th local sum components $d_2$ to $d_n$ are supplied in pairs to the vector adder 15 in n synchronism with the (n+m)-th through (2n+m−1)-th clock pulses.

As a result, a first output component $o_1$ of the output vector O appears on the output line 18 in synchronism with an (n 30 2m−1)-th one of the clock pulses. In a like manner, second through n-th output components $o_2$ to $o_n$ are produced through the output line 18 in timed relation to $(n+2m)$-th through $2(n+m-1)$-th clock pulses, respectively.

Accordingly, it takes a time duration of $2(n+m-1)T$ to carry out the vector addition of three vectors, each of which is composed of n components.

Let the vector adder 15 illustrated in FIG. 1 be used for calculating a total sum of components. It is presumed that the components are equal in number to $2^n$, where n is a positive integer. In this case, the $2^n$ components are divided into first and second groups, each of which is composed of $2^{n-1}$ components. The first and the second groups of components may be recognized as first and second vectors A and B, respectively. The components of the first and the second vectors A and B are collectively depicted at $a_i$ and $b_i$ and carry out the vector addition of $a_i$ and $b_i$ in the above-mentioned manner to produce local sum components $c_i$, the number of which is equal to $2^{n-1}$. Likewise, $2^{n-1}$ local sum components $c_i$ are further divided into first and second parts each of which is composed of $2^{n-2}$ local sum components. The vector addition is carried out between the local sum components $a_i'$ of the first part and those $b_i'$ of the second part to produce $2^{n-2}$ additional sum components $c_i'$. Thereafter, similar procedures are repeated by dividing such additional sum components into halves and by carrying out the vector addition between divided components until calculation of the total sum comes to an end.

Let a calculation time between two components be defined by mT like in the above-mentioned example when the vector adder 15 is used to calculate the total sum of the components equal in number to $2^n$.

Referring to FIG. 3 in addition to FIG. 1, first ones $a_1$ and $b_1$ of the components of the first and the second vectors A and B are given through the first and the second input lines 16 and 17 to the vector adder 15 in timed relation to a zeroth one of the clock pulses. Subsequently, second through $2^{n-1}$-th components of the first and the second vectors A and B are successively supplied to the vector adder 15 in synchronism with first through $(2^{n-1}-1)$-th clock pulses, respectively. In FIG. 3, a simplified symbol r is substituted for $2^{n-1}$ merely for simplification of illustration. The simplified symbol will be used also in the following.

First through r-th ones $c_1$ to $c_r$ of the local sum components appear on the output line 18 in synchronism with m-th through $(r+m-1)$-th clock pulses, respectively, as shown in FIG. 3. Therefore, a calculation time of $(2^{n-1}+m-1)T$ is required to calculate the $2^{n-1}$ local sum components. This shows that it takes a first local calculation time o $(r+m-1)T$ to calculate a first local sum of the $2^{n-1}$ local sum components.

Thereafter, the first through r-th local sum components $c_1$ to $c_r$ are divided into the first and the second parts, each of which is composed of $2^{n-2}$ components. A first pair $a_1'$ and $b_1'$ of the components of the first and the second parts is supplied to the vector adder 15 in synchronism with $(r+m-1)$-th clock pulse. Subsequently, second through s-th pairs $a_2'$ and $b_2'$ through $a_s'$ and $b_s'$ are successively supplied to the vector adder 15 in response to $(r+m+s-2)$ clock pulses, respectively, where s is equal to $2^{n-2}$. The resultant additional sum components $c_i'$ appear in response to $(r+2m-1)$ through $(r+s+2m-2)$ clock pulses, where i is a variable between 1 and s, both inclusive. Accordingly, a second local calculation time for a second local sum of the $2^{n-2}$ local sum components becomes equal to $(2^{n-2}+(m-1))T$.

In a like manner, local calculation times should be added to one another to obtain a total calculation time for calculating the total sum of $2n$ components. Therefore, the total calculation time is given by:

$$\sum_{i=0}^{n-1}(2^i+m-1)T = \left\{\sum_{i=0}^{n-1}2^i + \sum_{i=0}^{n-1}(m-1)\right\}T$$
$$= \{2^n - 1 + n(m-1)\}T.$$

In order to reduce $2^n$ components into $2^k$ components by carrying out the addition in the above-mentioned manner, where k is a positive integer smaller than n, a partial calculation time is given by:

$$\sum_{i=k}^{n-1}(2^i+m-1)T = \left\{\sum_{i=k}^{n-1}2^i + \sum_{i=k}^{n-1}(m-1)\right\}T$$
$$= \{2^n - 2^k + (n-k)(m-1)\}T.$$

If n, m, and k are equal to 4, 3, and 2, respectively, the total calculation time and the partial calculation time are equal to 23T and 16T, respectively.

Figure 4:
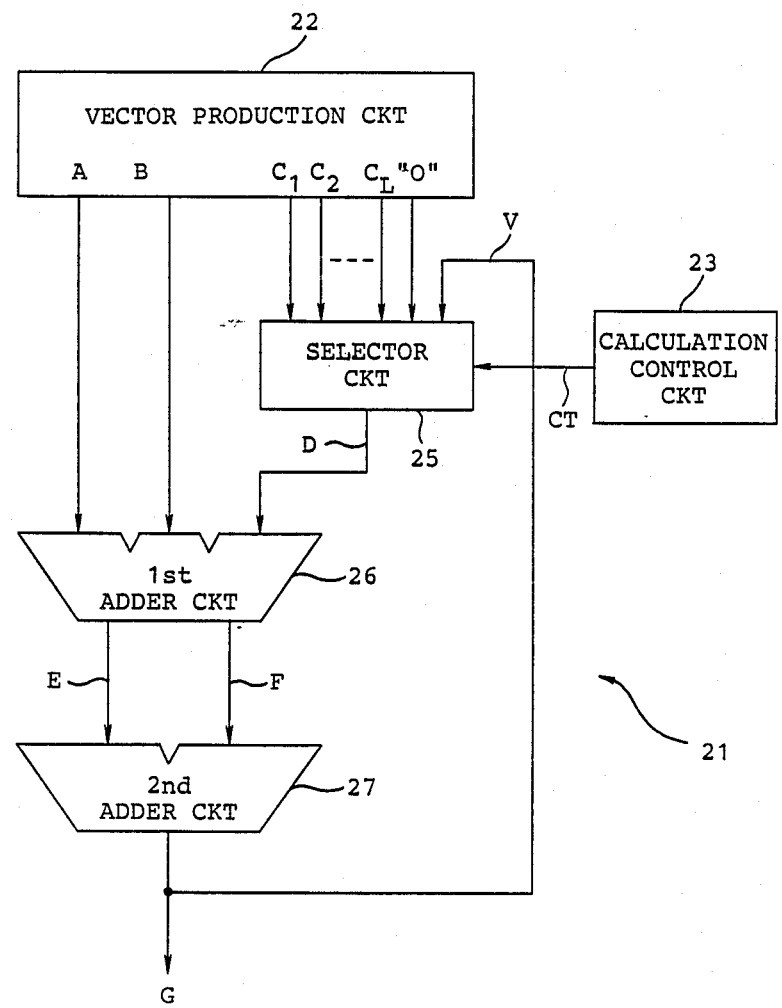
FIG. 4 is a block diagram of a vector calculation circuit according to a first embodiment of this invention.

Referring to FIG. 4, a vector calculation circuit 21 according to a first embodiment of this invention is for use in combination with a vector production circuit 22 and a calculation control circuit 23, both of which are operable in a manner to be described later. The vector production circuit 22 may be, for example, vector registers while the calculation control circuit 23 may be, for example, a timing controller operable in a manner to be described in conjunction with FIG. 5.

The vector calculation circuit 21 is supplied from the vector production circuit 22 with first and second vectors A and B together with first through L-th additional vectors $C_1$ to $C_L$, where L is a positive integer. Furthermore, a fixed value of "0" (zero) is also supplied from the vector production circuit 22 to the vector calculation circuit 21.

It is surmised that each of the first and the second vectors A and B and the first through L-th additional vectors $C_1$ to $C_L$ is composed of first through n-th components, where n is also a positive integer. In this connection, the first through n-th components of the first and the second vectors A and B are represented by $(a_1, a_2, \ldots, a_n)$ and $(b_1, b_2, \ldots, b_n)$, respectively. Likewise, the first through n-th components of the first through L-th additional vectors $C_1$ to $C_L$ are collectively represented by $(c_{j1}, c_{j2}, \ldots, c_{jn})$, where j is a variable between 1 and L, both inclusive.

The first through L-th vectors $C_1$ to $C_L$ are given to a selector circuit 25 which is supplied from the calculation control circuit 23 with a control signal CT and which is controlled in response to the control signal CT, as will become clear as the description proceeds. The selector circuit 25 is also given an internal vector V which is composed of first through n-th components $v_l$ to $v_n$ and which will be described later.

Under the circumstances, the first components of the first through L-th additional vectors $C_1$ to $C_L$ and the internal vector V are supplied to the selector circuit 25 as a first component set together with the fixed value of zero at a first time instant. Likewise, the second through n-th components of the respective vectors $C_1$ to $C_L$ and are produced as second through n-th component sets at second through n-th time intervals, respectively. Accordingly, an i-th component set produced at an i-th time interval is collectively represented by $c_{ji}$, $v_i$, and 0, where i is a variable between 1 and n, both inclusive.

Responsive to the control signal CT, the selector circuit 25 selects one of $c_{ji}$, $v_i$, and 0 as a selected component $d_i$ at an i-th time interval. Inasmuch as such selection is successively carried out at the first through n-th time intervals, the selector circuit 25 produces a third vector D composed of first through n-th components $d_1$ to $d_n$ which may be called third-set components. At any rate, one of the third-set components $d_1$ to $d_n$ is produced as a selected component from the selector circuit 25.

A first adder circuit 26 is operable in response to the first, the second, and the third vectors A, B, and D and comprises a carry save adder for carrying out a carry save addition of the first through third vectors A, B, and D. In addition, the first adder circuit 26 may comprise a plurality of flip-flops like in the vector adder 15 (FIG. 1) so as to process the first through third vectors A, B, and D in a pipeline fashion.

More specifically, the first adder circuit 26 is given the first components $a_1$, $b_1$, and $d_1$ of the first through third vectors A, B, and D in parallel at the first time interval. The second through n-th components of the first through third vectors A, B, and D are given to the first adder circuit 26 at the second through n-th time intervals in a similar manner in parallel. In this event, the i-th component $d_i$ of the third vector D is given from the selector circuit 25 as the selected component while the remaining i-th components $a_i$ and $b_i$ of the first and the second vectors A and B are given from the vector production circuit 22 as requisite components of the first and the second vectors A and B.

Under the circumstances, the first adder circuit 26 produces a result of the carry save addition of three parallel components when a predetermined calculation time of mT lapses after reception of the three parallel components, where T is representative of a clock cycle of clock pulses, like in FIG. 1.

It is mentioned here that the first through i-th time intervals are defined by zeroth through (i−1)-th clock pulses, respectively, like in FIGS. 2 and 3.

The result of the carry save addition which appears at the i-th time instant is divisible into a local sum $e_i$ and a carry $f_i$.

Herein, a sum of the local sum $e_i$ and the carry $f_i$ is equal to a sum of the three components $a_i$, $b_i$, and $d_i$, and is therefore given by:

$$e_i + f_i = a_i + b_i + d_i. \quad (1)$$

More particularly, when each of the components $a_i$, $b_i$, and $d_i$ is represented by z bits, each bit $e_i(q)$ of the local sum $e_i$ and each bit $f_i(q+1)$ of the carry $f_i$ are defined by:

$$e_i(q) = a_i(q) \oplus b_i(q) \oplus d_i(q) \text{ and}$$

$$f_i(q+1) = a_i(q)b_i(q) + b_i(q)d_i(q) + d_i(q)a_i(q), \quad (2)$$

where an encircled plus sign is representative of an addition modulo 2 and q is a variable between 0 and z, both inclusive. As a result, a succession of the local sums and a succession of the carries may be recognized as first and second result vectors E and F, respectively, when the local sums and the carries are successively produced from the first time interval to the n-th time interval. The first and the second result vectors E and F are therefore represented by:

$$E = (e_1, e_2, \ldots, e_n) \text{ and}$$

$$F = (f_1, f_2, \ldots, f_n).$$

A second adder circuit 27 is connected to the first adder circuit 26 in cascade to add the first result vector E to the second result vector F to produce a primary vector G which is composed of first through n-th primary sums $(g_1, g_2, \ldots, g_n)$ From this fact, it is readily understood that the i-th primary sum $g_i$ is given by:

$$g_i = e_i + f_i.$$

The primary sum $g_i$ is finally produced as a result of the vector calculation on one hand and is fed back to the selector circuit 25 as the component $v_i$ of the internal vector V.

It is to be noted here that such a cascade connection of the first and the second adder circuits 26 and 27 requires no extra clock pulse and never prolongs the calculation time.

Figure 5:
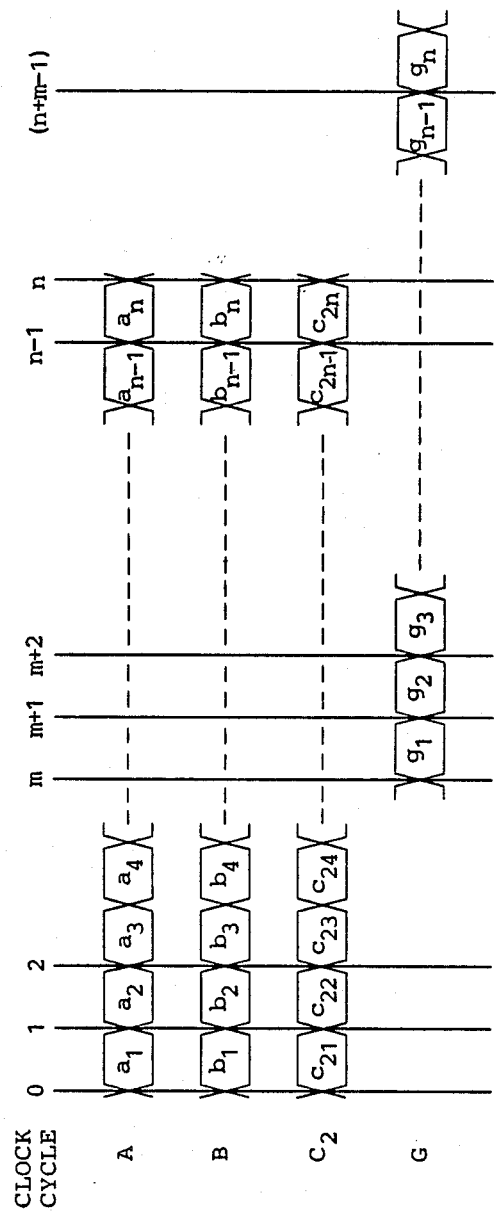
FIG. 5 is a time chart for use in describing operation of the vector calculation circuit illustrated in FIG. 4.

Referring to FIG. 5 together with FIG. 4, let the vector addition be carried out among the first and the second vectors A and B and the second additional vector $C_2$. In this case, it is supposed that each vector A, B, and $C_2$ is composed of n components and that each calculation time for the three parallel components is defined by mT, as mentioned before. In this case, the first and the second vectors A and B are composed of $(a_1, a_2, \ldots, a_n)$ and $(b_1, b_2, \ldots, b_n)$, respectively, while the second additional vector $C_2$ is composed of $(c_{2l}, c_{22}, \ldots, c_{2n})$.

At first, the selector circuit 25 successively selects the first through n-th components $(c_{2l}, c_{22}, \ldots, c_{2n})$ of the second additional vector $C_2$ in response to the control signal CT. The resultant components $(c_{2l}, c_{22}, \ldots, c_{2n})$ are delivered from the selector circuit 25 to the first adder circuit 26 as the first through n-th components $(d_1, d_2, \ldots, d_n)$ of the third vector D, respectively. On the other hand, the first adder circuit 26 is given the first through n-th components $a_1$ to $a_n$ and $b_1$ to $b_n$ of the first and the second vectors A and B in pairs.

In FIG. 5, the first components $a_1$, $b_1$, and $c_{2l}$ of the respective vectors A, B, and $C_2$ are synchronized with the zeroth clock pulse while the second components $a_2$, $b_2$, and $c_{22}$ are synchronized with the first clock pulse. The first components $a_1$, $b_1$ and $c_{2l}$ are added to one another through the first and the second adder circuits 26 and 27 and are produced as the first primary sum $g_1$ in synchronism with the m-th clock pulse. Likewise, the second components $a_2$, $b_2$, and $c_{22}$ through n-th components $a_n$, $b_n$, and $c_{2n}$ are successively added to one another to be produced as the second through n-th primary sums in synchronism with the (m+1)-th through (n+m−1)-th clock pulses, as illustrated in FIG. 5.

This shows that a total calculation time becomes equal to (n+m−1)T so as to carry out the vector calculation of three vectors each of which is composed of n components. If n and m are equal to 4 and 3, the total calculation time can be represented by 6T and is considerably shortened in comparison with the conventional total calculation time of 12T described in conjunction with FIG. 2.

Figure 6:
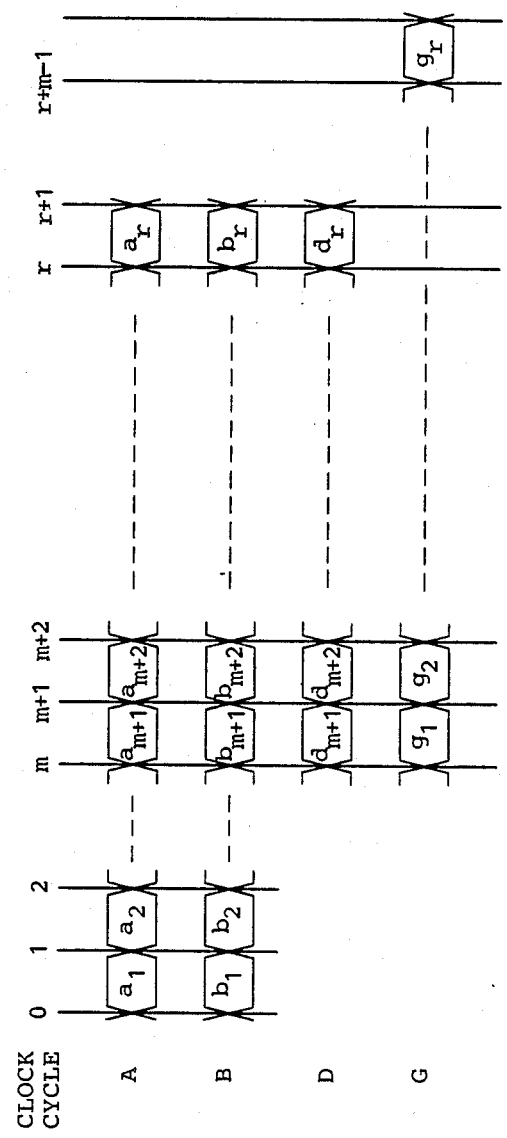
FIG. 6 is a similar time chart for use in describing another operation of the vector calculation circuit illustrated in FIG. 4.

Referring to FIG. 6 in addition to FIG. 4, description will be made about calculating a total sum of $2^n$ components. The components are divided into first and second groups which may be recognized as first and second vectors A and B. The first and second vectors A and B are composed of first through $2^{n-1}$-th (namely, r-th) components ($a_1, a_2, \ldots, a_r$) and ($b_1, b_2, \ldots, b_r$), respectively, where r is equal to $2^{n-1}$. It is assumed like in FIGS. 1 through 3 that the calculation time of mT is taken so as to carry out the vector addition of each set of the components of three vectors.

Under the circumstances, no primary sum appears from the second adder circuit 27 before production of the m-th clock pulse. Therefore, each pair of the first through m-th components of the first and the second vectors A and B may be successively added by the first and the second adder circuits 26 and 27 in synchronism with the zeroth through (m−1)-th clock pulses. Taking this into consideration, the selector circuit 26 selects the fixed value of zero as the components of the third vector D before production of the m-th clock pulse.

As a result, the first adder circuit 26 successively carries out the vector addition of the components $a_i$ and $b_i$ with the component $d_i$ kept at "0" to produce the local sum $e_i$ and the carry $f_i$ which are defined by Equation (1). The local sum $e_i$ and the carry $f_i$ are summed up by the second adder circuit 27 to produce the primary sum $g_i$ representative of the result of vector addition of $a_i$, $b_i$, and 0.

After lapse of the calculation time of mT, the primary sum $g_1, g_2, \ldots$ are added to the selector circuit 25 as the component $v_i$ of the internal vector V. As a result, the first primary sum $g_1$ appears in synchronism with the m-th clock pulse, as illustrated in FIG. 6. At any rate, the primary sums $g_1, g_2, \ldots$ are successively selected as the (m+1)-th, (m+2)-th, . . . components of the third vector D by the selector circuit 25 after production of the m-th clock pulse. Consequently, the illustrated vector calculation circuit 21 can carry out the vector calculation of the three vectors A, B, and D after the m-th clock pulse is produced. This shows that the (m+1)-th through $2^{n-1}$-th component pairs of the first and the second vectors A and B are added to the (m+1)-th through $2^{n-1}$-th components $d_{m+1}$ to $d_r$ of the third vector D after reception of the m-th clock pulse. When the (m+1)-th through $2^{n-1}$-th components are collectively depicted at an i-th component, the primary sums may be collectively represented by $g_{i-m}$.

Thus, the first adder circuit 26 carries out the carry save addition of $a_i$, $b_i$, and $d_i$ to successively produce the local sum e and the carry $f_i$ as regards the (m+1)-th through $2^{n-1}$-th components of the first and the second vectors A and B.

The second adder circuit 27 successively adds the local sum $e_i$ and the carry $f_i$ to produce the primary sum $g_i$ which is sent to the selector circuit 25 as the component $v_{i-m}$ of the internal vector V.

Let the primary sums be counted from the m-th clock pulse and be represented by $g_i$. Among the output components $g_i$, only partial ones of the primary sums, namely, $g_1, g_2, \ldots, g_{r-m}$ are sent to the selector circuit 25 while the remaining primary sums $g_{r-m+1}$ through $g_r$ appear as results of vector calculations.

As shown in FIG. 6, it takes a first local calculation time of $(2^{n-1}+m-1)T$ to obtain the remaining primary sums, m in number.

The remaining primary sums $g_{r-m+1}$ to $g_r$ are equal in number to m and are given by:

$$g_{r-m+1} = a_{r-m+1} + a_{r-2m+1} + a_{r-3m+1} + \cdots$$
$$\qquad + b_{r-m+1} + b_{r-2m+1} + b_{r-3m+1} + \cdots$$
$$g_{r-m+2} = a_{r-m+2} + a_{r-2m+2} + a_{r-3m+2} + \cdots$$
$$\qquad + b_{r-m+2} + b_{r-2m+2} + b_{r-3m+2} + \cdots$$
$$\vdots$$
$$g_r = a_r + a_{r-m} + a_{r-2m} + \cdots$$
$$\qquad + b_r + b_{r-m} + b_{r-2m} + \cdots.$$

Accordingly, it is possible to calculate the total sum of the $2^n$ components by totalizing the above-mentioned primary sums equal in number to m. Herein, consideration is made about a second local calculation time for totalizing the primary sums, m in number. At first, a certain positive number k is selected such that m be smaller than $2^k$ and greater than $2^{k-1}$, namely:

$$2^k \geq m \geq 2^{k-1}.$$

In this case, the second local calculation time can be represented by:

$\{2^k - 1 + k(m-1)\}T$. A total calculation time for the total sum is equal to a sum of the first and the second local calculation times and is therefore given by:

$$(2^{n-1} + m - 1)T + \{2^k - 1 + k(m-1)\}T =$$
$$\{2^{n-1} + 2^k - 1 + (k+1)(m-1)\}T.$$

If n, m, and k are equal to 4, 3, and 2, respectively, the total calculation time becomes equal to 17T.

Figure 7:
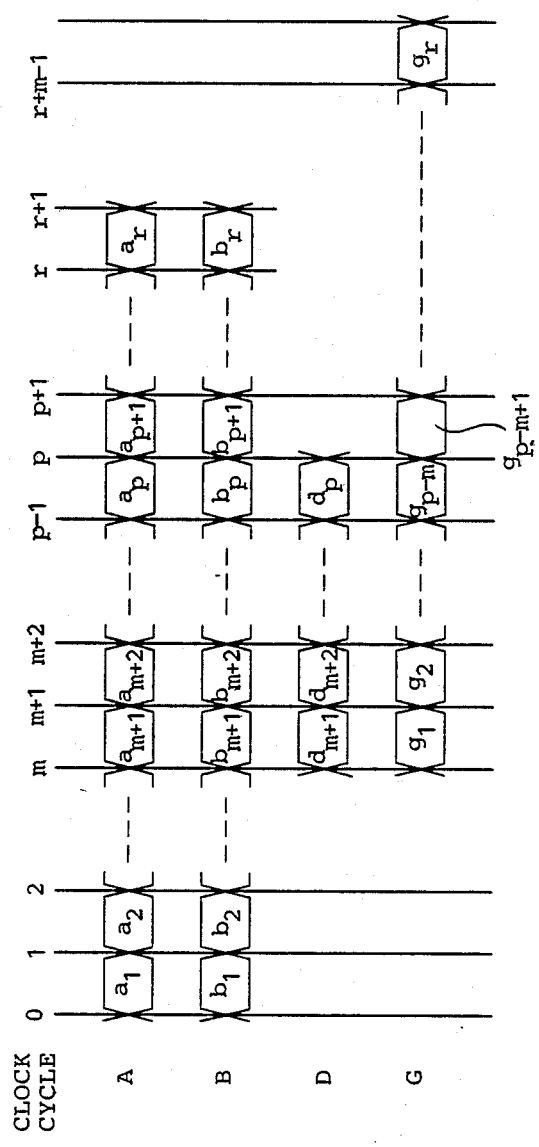
FIG. 7 is another time chart for us in describing a further operation of the vector calculation circuit illustrated in FIG. 4.

Referring to FIG. 7, another calculation is carried out by the use of the vector calculation circuit 21 illustrated in FIG. 4 so as to calculate a total sum of the first and the second vectors A and B each of which is composed of components, $2^{n-1}$ in number. In FIG. 7, first through m-th primary sums are calculated in the above-mentioned manner as regards first through p-th ones of the components, where $p=2^{n-1}-t$ and where, in turn, t represents a positive integer. As regards the remaining components, t in number, the vector addition of two vectors is carried out after production of a p-th clock pulse, as shown in FIG. 7. As a result, primary sums, (m+r) in number, are readily calculated and can be represented by $g_{p-m+1}, g_{p-m+2}, \ldots, g_p, \ldots, g_r$. Therefore, it is possible to select the number of the primary sums at a predetermined number which is not smaller than m.

Figure 8:
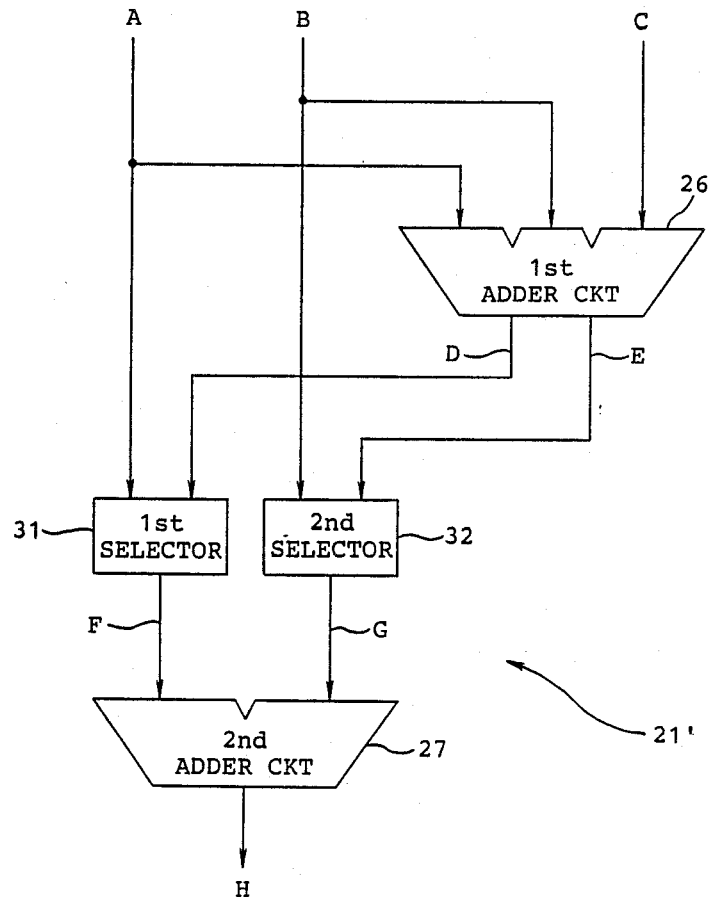
FIG. 8 is a block diagram of a vector calculation circuit according to a second embodiment of this invention.

Referring to FIG. 8, a vector calculation circuit 21' according to a second embodiment of this invention is supplied from a vector production circuit (not shown in FIG. 8) with first, second, and third vectors A, B, and C which are composed of first through n-th components ($a_1, a_2, \ldots, a_n$), ($b_1, b_2, \ldots, b_n$), and ($c_1, c_2, \ldots, c_n$), respectively. The first through third vectors A to C are given to a first adder circuit 26 which is similar in structure and operation to that illustrated in FIG. 4 while the first and the second vectors A and B are given to first and second selectors 31 and 32.

The first adder circuit 26 carries out a vector addition of the first through third vectors A to C in the manner illustrated in FIG. 4 to produce a result of carry save addition which is divisible into first and second local vectors D and E. The first and the second local vectors D and E are composed of first through n-th local components $(d_1, d_2, \ldots, d_n)$ and $(e_1, e_2, \ldots, e_n)$ which represent local sums and carries appearing on the carry save addition, respectively. Like in Equations (1) and (2), the local sum and the carry can be collectively given by:

$$d_i + e_i = a_i + b_i + c_i,$$

$$d_i(q) = a_i(q) \oplus b_i(q) \oplus c_i(q), \text{ and}$$

$$e_i(q+1) = a_i(q)b_i(q) + b_i(q)c_i(q) + c_i(q)a_i(q), \quad (3)$$

where i is variable between 1 and n, both inclusive, and q is a variable between 0 and z when each components $a_i$, $b_i$, and $c_i$ is composed of z bits.

The first and the second local vectors D and E are delivered to the first and the second selectors 31 and 32 which are supplied with the first and the second vectors A and B, respectively. The first and the second selectors 31 and 32 are operable in response to a control signal (not shown) given from a calculation control circuit (not shown in FIG. 8).

Consequently, the first selector 31 selects either the component $a_i$ of the first vector A or the component $d_i$ of the first additional vector D to produce a first selected component $f_i$ which forms a first selected vector F. This shows that the first selected vector F is composed of $(f_1, f_2, \ldots, f_n)$. Likewise, the second selector 32 selects either the component $b_i$ of the second vector B or the component $e_i$ of the second additional vector E to produce a second selected component $g_i$ which forms a second selected vector G composed of $(g_1, g_2, \ldots, g_n)$.

The first and the second selected vectors F and G are sent to a second adder circuit 27 which is similar in structure and operation to that illustrated in FIG. 4. The second adder circuit 27 adds the first selected component $f_i$ to the second selected component $g_i$ to produce an output vector H composed of first through n-th output components $(h_1, h_2, \ldots, h_n)$. In this event, the i-th output component $h_i$ is given by:

$$h_i = f_i + g_i.$$

Figure 9:
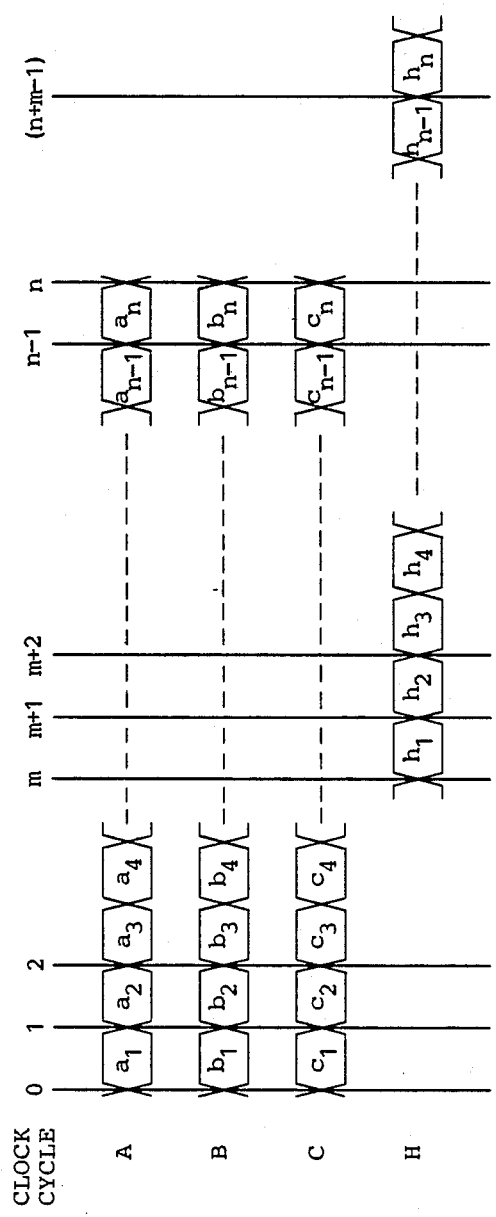
FIG. 9 is a time chart for use in describing operation of the vector calculation circuit illustrated in FIG. 8.

Referring to FIG. 9 afresh and FIG. 8 again, it is assumed that the first through third vectors have first through n-th components $(a_1, a_2, \ldots, a_n)$, $(b_1, b_2, \ldots, b_n)$, and $(c_1, c_2, \ldots, c_n)$ and are added to one another by the use of the vector calculation circuit 21' illustrated in FIG. 8. It is also assumed that first through n-th sets of three components $(a_1, b_1, c_1)$, $(a_2, b_2, c_2), \ldots, (a_n, b_n, c_n)$ are successively given to the vector calculation circuit 21' and that a calculation time for each set is equal to mT, where m is a positive integer and T is a clock cycle.

Each set of the three components is collectively depicted at $a_i$, $b_i$, and $c_i$ and is added by the first adder circuit 26 into the first and the second local components $d_i$ and $e_i$.

On the vector addition of three vectors, the first and the second selectors 31 and 32 select the first and the second additional vectors D and E, respectively, in response to the control signal. Therefore, the first local components $d_i$ and $e_i$ are selected by the first and the second selectors 31 and 32 to be produced as the first and the second selected components fi and gi, respectively. Thereafter, the first and the second selected components $f_i$ and $g_i$ are added by the second adder circuit 27 to produce the output component $h_i$.

As shown in FIG. 9, the first set of the components $a_1$, $b_1$, and $c_1$ are given to the vector calculation circuit 21' in synchronism with the zeroth clock pulse while the output component $h_1$ is produced in synchronism with the m-th clock pulse. The output component $h_n$ which results from the n-th set of $a_n$, $b_n$, and $c_n$ is produced in synchronism with an (n+m−1)-th clock pulse. Accordingly, the vector addition of three vectors can be completed in a calculation time of (n+m−1)T.

Figure 10:
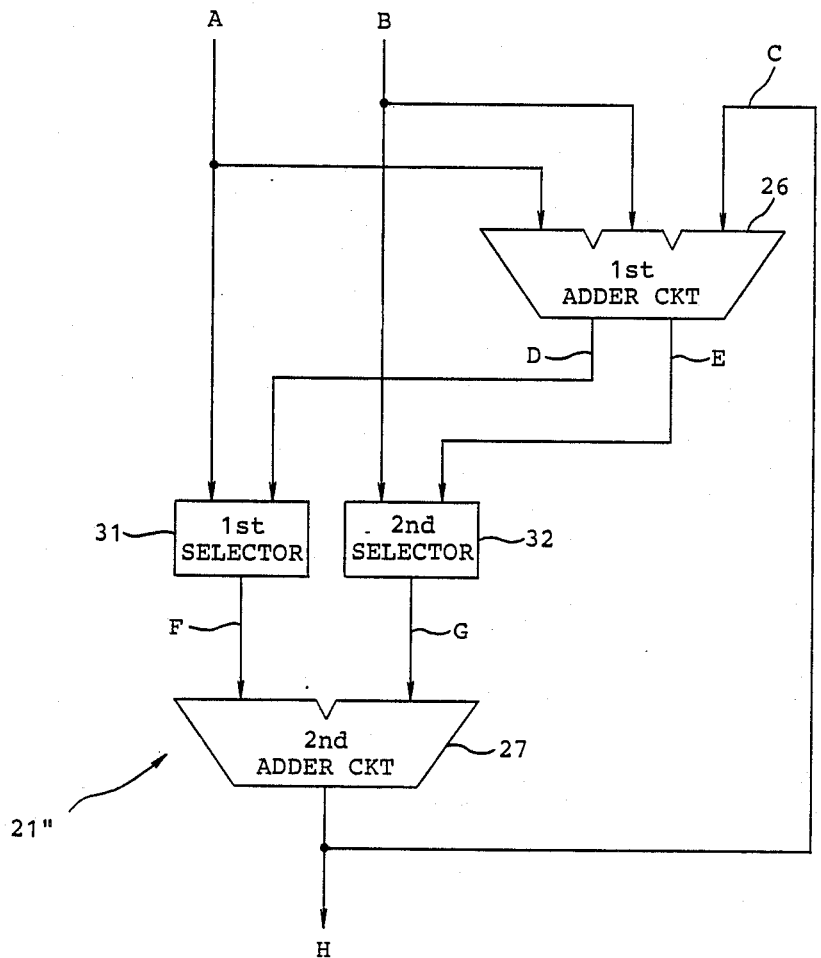
FIG. 10 is a block diagram of a vector calculation circuit according to a third embodiment of this invention.
Figure 11:
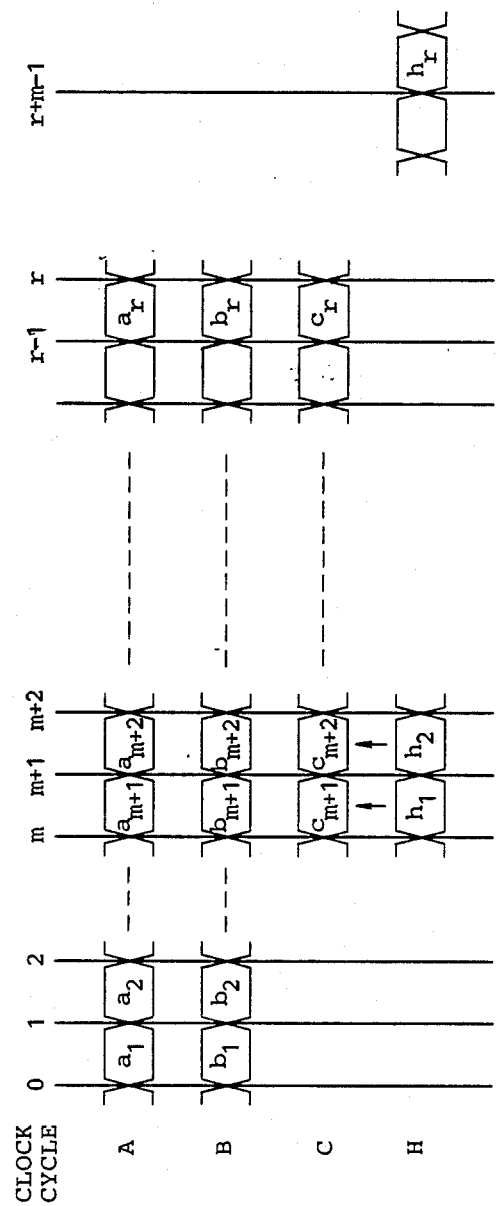
FIG. 11 is a time chart for use in describing operation of the vector calculation circuit illustrated in FIG. 10.

Referring to FIGS. 10 and 11, a vector calculation circuit 21″ according to a third embodiment of this invention is similar in structure and operation to that illustrated in FIG. 8 except that the output vector H is supplied to the first adder circuit 26 as the third vector C. This structure is helpful for calculating a total sum of components equal in number to $2^n$ like in FIG. 4. The components, $2^n$ in number, are divided into first and second vectors A and B which are composed of first through $2^{n-1}$-th (namely, r-th) components $(a_1, a_2, \ldots, a_r)$ and $(b_1, b_2, \ldots, b_r)$, where r is equal to $2^{n-1}$. As shown in FIG. 11, the first through r-th components are successively given to the vector calculation circuit 21″ in pairs in timed relation to zeroth through (r − 1)-th clock pulses, respectively. Let the i-th components $a^i$ and $b^i$ be added to each other by the vector calculation circuit 21″ where i is variable between 1 and $2^{n-1}$, both inclusive, and be calculated for a calculation time of mT like in FIGS. 4 and 8.

Like in FIG. 4, the output components can be used as the components of the third vector C after reception of the m-th clock pulse. Taking the above into account, the illustrated vector calculation circuit 21″ carries out the vector addition of the first and the second vectors A and B when the first through m-th components are given to the vector calculation circuit 21″. The vector addition of the first through third vectors A, B, and C is carried out in the vector calculation circuit 21″ when the m-th clock pulse is produced. For convenience of description, the output components $h_1$ through $h_r$ are given to the first adder circuit 26 as (m+1)-th through (m+r)-th components $c_{m+1}$ to $c_{m+r}$, respectively.

More particularly, when i is not greater than (m+1), the first and the second selectors 31 and 32 select the components $a_i$ and $b_i$ of the first and the second vectors A and B, respectively. Therefore, the components $a_i$ of the first vector A are successively sent from the first selector 31 as the first selected components $f_i$ while the components bi of the second vector B are successively sent from the second selector 32 as the second selected components $g_i$, where i=1, 2, . . . , m.

The first and the second selected components $f_i$ and $g_i$ are added to each other by the second adder circuit 27 to be produced as the output components $h_i$ which successively appear after lapse of the calculation time mT, as shown in FIG. 11. In this connection, it is readily understood that the second adder circuit 27 comprises a plurality of flip-flop stages, m in number, in addition to an adder.

When i is greater than m, namely, i=m+1, m+2, .. ., $2^{n-1}$, the output components $h_{i-m}$ are successively sent back to the first adder circuit 26 as the i-th components of the third vector C. The first adder circuit 26 successively carries out the carry save addition of three components, namely, $a_i$, $b_i$, and $c_i$ in response to the m-th through (r−1)-th clock pulses to produce the first and the second local components $d_i$ and $e_i$ which are given by Equation (3) and which are given to the first and the second selectors 31 and 32, respectively.

After lapse of the calculation time mT, the first and the second selectors 31 and 32 select the first and the second local components $d_i$ and $e_i$ as the first and the second selected components $f_i$ and $g_i$, respectively. The first and the second selected components $f_i$ and $g_i$ are successively added to each other by the second adder circuit 27 in the above-mentioned manner to produce the output component $h_{i-m}$.

From this fact, it is readily understood that the output components $h_{i-m}$ are sent back to the first adder circuit 26 as the components $c_i$ of the third vector C for a duration defined between the m-th clock pulse and the $2^{n-1}$-th (namely, r-th) clock pulse. Counted from the m-th clock pulse, the output components may be represented by $h^i$ and are given as the components $c_{i+m}$ of the third vector C. Among the output components $h_i$, only partial ones of the output components, namely, $h_1$, $h_2$, ..., $h_{r-m}$ are sent to the first adder circuit 26 while the remaining output components $h_{r-m+1}$ through $h_r$ appear as results of vector calculations.

The remaining output components $h_{r-m+1}$ through $h_r$ are given by:

$$
\begin{aligned}
h_{r-m+1} &= a_{r-m+1} + a_{r-2m+1} + a_{r-3m+1} + \cdots \\
&+ b_{r-m+1} + b_{r-2m+1} + b_{r-3m+1} + \cdots \\
h_{r-m+2} &= a_{r-m+2} + a_{r-2m+2} + a_{r-3m+2} + \cdots \\
&+ b_{r-m+2} + b_{r-2m+2} + b_{r-3m+2} + \cdots \\
&\vdots \\
h_r &= a_r + a_{r-m} + a_{r-2m} + \cdots \\
&+ b_r + b_{r-m} + b_{r-2m} + \cdots .
\end{aligned}
$$

As mentioned above, the results of vector calculations are equal in number to m and must be further summed up so as to calculate the total sum of $2^n$ components.

In order to sum up the results, m in number, let a positive number j be selected such that j satisfies the following condition:

$$2^j > m > 2^{j-1}.$$

Taking the positive number j into account, a time for the summation of the m results is given by:

$$\{2^j - 1 + j(m-1)\}T.$$

Therefore, a total time is given by summing up the first and the second summation times and is therefore defined by:

$$(2^{n-1} + m - 1)T + \{2^j - 1 + j(m-1)\}T =$$

$$\{2^{n-1} + 2^j - 1 + (j+1)(m-1)\}T.$$

When n and m are equal to 4 and 3, respectively, the total time becomes equal to 17T because j=2.

Figure 12:
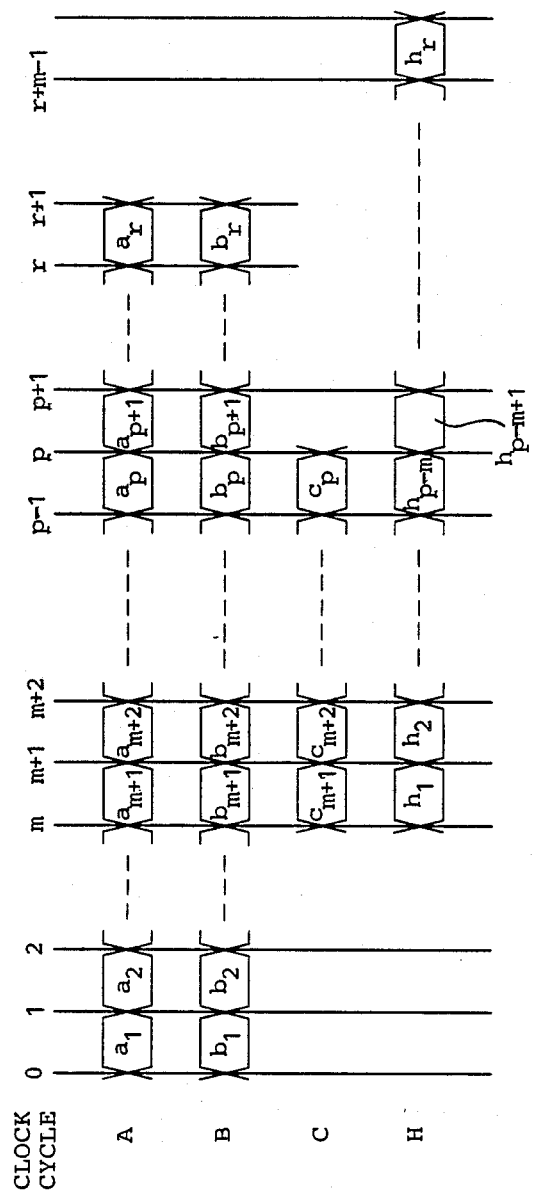
FIG. 12 is another time chart for use in describing another operation of the vector calculation circuit illustrated in FIG. 10.

Referring to FIG. 12, another calculation may be carried out by the vector calculation circuit 21'' (FIG. 10) in a manner different from that illustrated in FIG. 11. As shown in FIG. 12, the components, $2^{n-1}$ in number, of each vector A and B are divided into first and second parts which are composed of p and t components, respectively, where p is equal to $(2^{n-1} - t)$.

As regards the first part of p components, addition is successively carried out in consideration of the output vector H in the above-mentioned manner. As a result, calculation results, m in number, are calculated after the p-th clock pulse and appear as $h_{p-m+1}$, $h_{p-m+2}$, ..., $h_p$.

On the other hand, the first and the second vectors A and B are added without the third vector C as regards t components of the first and the second vectors A and B to produce calculation results, t in number, which appear as $h_{p+1}$, $h_{p+2}$, ..., $h_r$, where r is equal to $2^{n-1}$.

The calculation results, (m + t) in number, are further added to one another in a manner similar to that illustrated in FIG. 11 to calculate the total sum of 2n components.

While this invention has thus far been described in conjunction with a few embodiments thereof, it will readily be possible for those skilled in the art to put this invention into practice in various other manners. For example, the first adder circuit 26 illustrated in FIGS. 8 and 10 may be connected to a selector circuit 25 as shown in FIG. 4 so as to select one of vectors given to the first adder circuit 26. At any rate, the vector calculation circuit illustrated in FIGS. 8 and 10 can respond to a plurality of vectors which are greater in number than three.

What is claimed is:

1. A vector calculation circuit for use in carrying out a vector calculation to provide a result of said vector calculation in response to a first vector composed of a plurality of first-set components and a second vector composed of a plurality of second-set components and selectively to a third vector composed of a plurality of third-set components, said vector calculation circuit comprising:

selecting means responsive to one of said third-set components and a fixed value of zero for selecting, as a selected component, a selected one of said one of the third-set components and said fixed value;

a carry save adder responsive to said selected component and requisite ones of said first-set and said second-set components for carrying out a carry save addition among said selected component and said requisite ones of the first-set and the second-set components to produce a local sum and a carry collectively as a result of said carry save addition;

an additional adder responsive to said local sum and said carry for adding said carry to said local sum to produce a primary sum of said local sum and said carry; and means for producing said primary sum as said result of vector calculation.

2. A vector calculation circuit as claimed in claim 1, further comprising:

means for supplying said primary sum to said selecting means as one of said third-set components.

3. A vector calculation circuit for use in carrying out a vector calculation to provide a result of said vector calculation in response to a first vector composed of a plurality of first-set components and a second vector composed of a plurality of second-set components and selectively to a third vector composed of a plurality of third-set components, said vector calculation circuit comprising:

a carry save adder responsive to said first, second, and third vectors for carrying out a carry save addition of requisite ones of said first- through third-set components to produce a local sum and a carry collectively as said carry save addition;

first selector means for selecting either of said local sum and the requisite one of said first-set components as a first selected component;

second selector means for selecting either of said carry and the requisite one of said second-set components as a second selected component;

an additional adder coupled to said first and said second selector means for adding said first selected component to said second selected component to produce said result of the vector calculation.

4. A vector calculation circuit as claimed in claim 3, further comprising:

means for supplying said result of the vector calculation to said carry save adder as one of said third-set components together with following ones of said first- and said second-set components.

* * * * *